United States Patent
Leck

(10) Patent No.: US 6,248,435 B1
(45) Date of Patent: Jun. 19, 2001

(54) HEAT TRANSFER RELEASE FINISH

(75) Inventor: Thomas J. Leck, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/144,775

(22) Filed: Sep. 1, 1998

(51) Int. Cl.[7] ....................................................... B32B 5/16
(52) U.S. Cl. ........................ 428/323; 428/332; 428/421; 428/422; 428/461; 220/573.2
(58) Field of Search ................................. 428/323, 324, 428/329, 332, 411.1, 421, 422, 457, 461, 688, 543, 900, 908.8, 926, 928, 231; 220/573.2, 912

(56) References Cited

U.S. PATENT DOCUMENTS

| | | |
|---|---|---|
| 3,767,505 * | 10/1973 | Coran et al. .......................... 156/276 |
| 4,039,713 | 8/1977 | Vassiliou ............................... 428/324 |
| 4,049,863 | 9/1977 | Vassiliou ............................... 428/324 |
| 4,180,609 * | 12/1979 | Vassiliou ............................... 428/212 |
| 4,838,347 * | 6/1989 | Dentini et al. ........................ 165/185 |
| 5,443,876 * | 8/1995 | Koskenmaki et al. ................. 428/40 |
| 5,478,651 | 12/1995 | Tannenbaum ......................... 428/422 |
| 5,522,962 * | 6/1996 | Koskenmaki et al. ............ 156/272.4 |
| 5,718,963 * | 2/1998 | Batzar ................................... 428/141 |

FOREIGN PATENT DOCUMENTS 1131038    10/1968   (GB) ................................ B44F/3/00

* cited by examiner

Primary Examiner—D. S. Nakarani
Assistant Examiner—Christopher Paulraj

(57) ABSTRACT

An improved heat transfer release finish on cookware is formed by coating the cookware interior (sidewall and flat bottom) with a mixture of fluoropolymer and magnetic flakes and magnetically orienting said flakes to run in the thickness direction of the coating, followed by baking the coating. Advantageously, the coating mixture also contains compatibilizing polymer which enables the flakes to be so-oriented without creating minute fissures in the coating.

11 Claims, 2 Drawing Sheets

HEAT TRANSFER RELEASE FINISH

FIELD OF THE INVENTION

This invention relates to release coatings to form a non-stick finish on an article and to compositions therefor.

BACKGROUND OF THE INVENTION

Non-stick finishes (coatings) for such articles as cookware are well known. The anomaly in this art is that the coating must release the food cooked on the coating, but must not release from the substrate, i.e., the metal, glass, or ceramic material of construction of the cookware. This paradox has been addressed by (a) treating the substrate surface to promote adhesion, e.g. by grit blasting, and/or (b) multilayer coating processes for the substrate, wherein the primer layer has both a thermally stable non-fluorinated polymer for bonding to the substrate and a fluoropolymer for bonding to an overlying fluoropolymer release layer. Nevertheless, the interface between the substrate and the overall release coating is still a major region of failure of the coating, caused by the repeated heating and cooling of the cookware in use. The heating and cooling subjects the interface to the stress of differential expansions between the substrate and the polymer-containing release coating, which can eventually cause the coating to separate from the substrate, giving the coating on the cookware and bakeware a blistered appearance and exposing the coating to easy puncturing and loss of release property. The repetitive exposure of the coating to heating during cooking also tends to cause degradation of the primer layer at the substrate interface, which leads to blistering of the overall coating or reduction in the bond between the release coating and the substrate such that the release coating can be scraped off.

SUMMARY OF THE INVENTION

The present invention overcomes this problem by providing a release coating on cookware which enables the cookware to be used at lower cooking temperatures to achieve the same cooking result.

The present invention solves this problem by providing a substrate having a baked fluoropolymer release coating thereon, said coating containing magnetizable flakes oriented primarily in the thickness direction of said coating so as to be free of pattern. The thickness direction orientation of the flakes improves the thermal conductivity of the release coating. When heat is applied to the underside of the substrate, as is the case when the substrate is cookware, the temperature at the cooking surface of the release coating, which is the cooking temperature, will be higher as compared to the cooking temperature from a release coating which does not contain the thickness-direction oriented flakes. Thus according to the present invention, the heat applied to the underside of the substrate, such as by the cooktop burner, can be reduced, which in turn reduces the temperature at the interface between any primer used as part of the release coating to adhere it to the substrate. A reduction of only 20° F. (11° C.) at the substrate/primer interface can reduce the tendency of the primer to degrade by at least one-half. The present invention can provide better improvement than that. With reference to the cooking temperature (release coating surface), when the release coating without the thickness-oriented magnetizable flakes is heated to 400° F. (204° C.) through the coating substrate, the release coating used in the present invention provides a cooking temperature of at least 20° F. (11° C.) higher, preferably at least 30° F. (16.7° C.) higher, and more preferably at least 40° F. (22.2° C.) higher. These temperature differentials are based on the average cooking temperatures. The improved heat transfer of the release coating manifested by these higher cooking temperatures enables the applied heat to the underside of the substrate to be reduce accordingly to achieve the 400° F. cooking temperature, and the substrate/primer interface temperature will also be reduced accordingly.

Since the substrate will normally be in the form of cookware which has a flat bottom and sidewall extending upwardly from the flat bottom and since release coatings are normally applied to both the bottom and sides of the interior surface of the cookware, the magnetizable flakes will be present in the coating applied to both the bottom and sidewall. Heat is applied to the underside of the bottom of the cookware, i.e., the flat substrate portion thereof, to accomplish the cooking. Thus, it is only necessary for the magnetizable flakes in the coating on the flat bottom (substrate) to have the thickness direction orientation for conducting the applied heat to the cooking surface of the release coating. The importance of the absence of pattern will be explained below.

The thickness direction orientation of the magnetizable flakes in the release coating is obtained by the process of applying the release coating composition in liquid form to the substrate and while the resultant coating is still wet, subjecting the coating to magnetic force which orients the magnetizable flakes primarily in the thickness direction of the coating, followed by baking the coating to form the release coating and fix the flakes in their thickness-direction orientation. This thickness-direction orientation acts to improve the heat transfer between the substrate and the cooking surface of the release coating. Preferably the flakes include flakes having a longest dimension which is greater than the thickness of the layer of the release coating which contains the flakes, or the entire release coating if only one layer is used to form the coating. Such flakes extend through most or the entire thickness of the layer to provide optimum heat transfer effect.

Since improved heat transfer is desired over the entire flat surface of the cookware, because it is common to expose such cookware to heating over the entire underside of the cookware, the thickness direction orientation of the magnetizable flakes extends over the entire flat surface, i.e., in the portion of the coating that is on the flat surface. If magnetic force were not applied to the wet coating composition, the flakes would tend to orient in the plane of the coating, i.e., essentially parallel to the flat substrate surface, which would not provide efficient heat transfer through the thickness of the coating. The same would be true if the magnetic force were applied to only selected regions of the coating overlying the flat substrate, in which case the magnetizable flakes would form a pattern which would be visible in light reflected from the surface of the release coating. The parallel flakes (not reoriented by the magnetic force) would reflect the incident light while the coating-thickness oriented (reoriented) flakes would not reflect the incident light. The reflected light would give the coating a light-colored appearance, while the coating region where light would not be reflected would have dark appearance, the combination of light and dark regions in the coating providing a pattern to the viewer. The presence of a pattern is avoided in the present invention by having the flakes primarily thickness direction oriented, whereby, the entire interior bottom of the cookware (the release coating thereon) will have a dark appearance, i.e., no pattern.

A preferred composition of the present invention comprises 75 to 98 wt % fluoropolymer, 1 to 15 wt % magnetizable flakes, and 0.1 to 15 wt % of compatibilizing polymer, to total 100 wt % based on the combined weight of these three ingredients. The presence of the relatively small amount of compatibilizing polymer enables the flakes to have a long dimension which exceeds the thickness of the layer formed from the composition to be covered by fluoropolymer, even where tips of the flakes extend from the exposed surface of the layer. Such tips will thus be embedded in minute "mounds" of fluoropolymer from the layer composition, which thereby enable the layer to serve as a release coating. The compatibilizing polymer attracts the fluoropolymer to the flakes, so that when they are magnetically oriented in the thickness direction of the coating, the fluoropolymer is carried with the flakes. In the absence of the compatibilizing polymer, the reorientation of the flakes from the plane of the coating to the perpendicular direction, tends to create minute voids or fissures in the coating, resulting from the fluoropolymer not being carried with the reorienting flakes. These voids or fissures become loci for liquids and vapors to penetrate the coating to cause coating failure.

DETAILED DESCRIPTION

Figure 1:
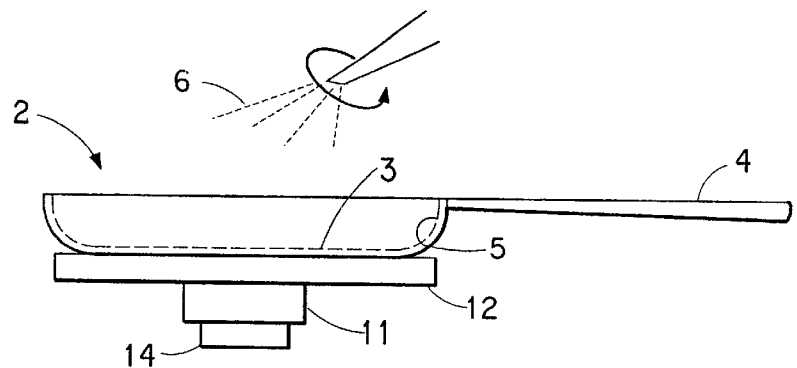
FIG. 1 shows in schematic side elevation an equipment arrangement for forming a release coating containing magnetizable flakes oriented primarily in the thickness direction of the coating.
Figure 2:
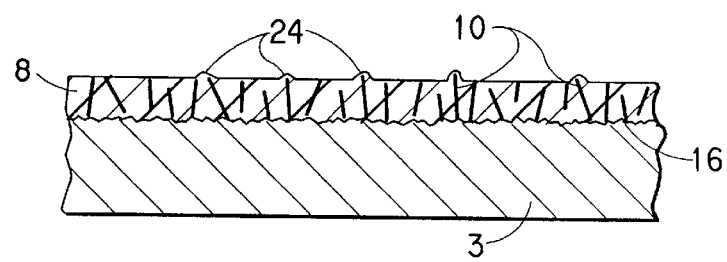
FIG. 2 shows in enlarged side elevation cross section one embodiment of coated substrate of the present invention.

In FIG. 1 is shown the substrate to be coated in accordance with the present invention, the substrate being in the form of a frying pan 2 of non-magnetizable material such as aluminum, copper, stainless steel, glass or ceramic. The frying pan 2 is shown to have a handle 4. A liquid coating composition which contains fluoropolymer and magnetizable flakes is applied as a spray 6 onto the interior surface of the frying pan 2. The spray is applied both to the flat bottom 3 and sidewall 5 of the pan 2 to form a release coating 8 such as shown in FIG. 2. Magnetic force applied by plate 12 made of magnetizable material such as steel causes the magnetizable flakes 10 to be oriented primarily in the thickness direction of the coating 8. Such orientation includes substantially all of the flakes being either perpendicular to the plane of the coating (and the flat bottom of the pan) or disposed at an acute angle from the perpendicular as shown in FIG. 2. The source of the magnetic force is a magnet 14 positioned beneath a steel diffuser block 11 interposed between plate 12 and magnet 14. The magnet 14 is sized relative to the bottom area of the block 11 so as to be smaller, whereby the lines of magnetic force directed from the magnet 14 towards the frying pan 2 are first diffused by (through) block 11, so as to be uniformly distributed across the entire width of plate 12, whereby the flakes in the coating overlying the flat bottom 3 are exposed to similar magnetic force. Plate 12 has a peripheral shape which can be circular, and the diameter of the circle formed by the plate is preferably greater than the diameter of the flat bottom 3 of the pan 2. The plate 12 cab has a different peripheral shape, such a quadrilateral, so long as it covers the entire flat bottom of the pan. Thus, the magnetic force communicated from the plate 12 to the flakes 10 (FIG. 2) is applied to the coating 8 over the entire interior surface of the flat bottom 3 of the pan 2. Orientation of the flakes 10 primarily in the thickness direction of the coating 8 serves to conduct heat applied to the underside of flat bottom 3, as would occur when the frying pan is used for cooking, to the top surface of the coating, thereby tending to reduce or substantially eliminate the temperature differential between the interface between the flat bottom 3 of the pan and the top surface of the coating 8, which is the cooking surface.

Figure 3:
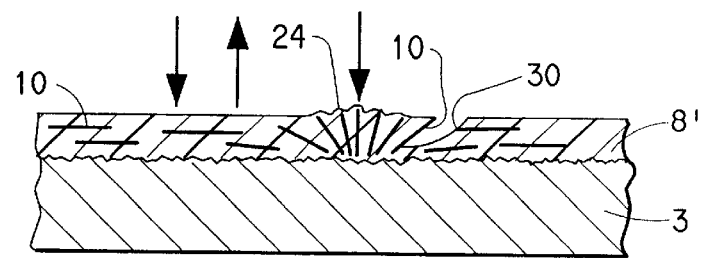
FIG. 3 shows a variation on the cross section of FIG. 2, wherein only a portion of the flat substrate if exposed to magnetic force, whereby only a corresponding portion of the flakes become oriented in the thickness direction of the coating.

Without the application of magnetic force to the applied coating, the magnetizable flakes would orient parallel to the plane. FIG. 3 shows the effect of applying magnetic force to only a portion of the coating 8', which is not in accordance with the present invention and which results in flakes 10 not exposed to magnetic force orienting themselves generally parallel to the plane of the coating, while flakes 10 which are exposed to magnetic force being oriented generally in the direction of the thickness of coating 8'. The coating 8' shown in FIG. 3 would exhibit a pattern visible in reflected light, corresponding to the parallel and perpendicular flakes in the coating. The parallel flakes reflect the incident light, producing a light color, while the perpendicular flakes absorb the incident light, producing a dark color, resulting in a pattern of light and dark color in the release coating. This is undesirable in the present invention, because the planar flakes are inefficient for heat transfer through the thickness of coating 8'. Thus, it is important feature of the present invention that the magnetizable flakes are oriented primarily in the thickness direction of the release coating so as not to form a pattern to reflected light, which means the flakes are oriented for optimum heat transfer through the thickness of the release coating. Thus, the plate such as plate 12 which is used to communicate the magnetic force of the magnet is solid over its lateral expanse and covers the entire underside of the flat bottom of the cookware. The magnetizable flakes present in the coating applied to the sidewall 5 of the frying pan tends not to be reoriented out of the plane of the sidewall release coating, which is inconsequential because the cooking heat is not applied through the sidewall of the frying pan.

The magnetic force applied to the release coating by the magnet through the diffuser block 11 is modulated by the thickness of the block 11 and the thickness of plate 12 and/or by including additional spatial gaps of non-magnetizable material (the thickness of flat bottom 3 is a spatial gap) as needed to produce the thickness-direction flake orientation. Such a gap can be achieved by using nonmagnetizable spacing sheets (not shown) between the diffuser block and the magnet or the plate or the plate can be spaced from the underside of the fry pan instead of being in contact therewith as shown in FIG. 1. Any gap in addition to the thickness of the flat bottom 3, spacing of the diffuser plate from the substrate and/or spacing of the diffuser plate from the magnet is selected to give the flake orientation primarily in the direction of the thickness of the coating. Magnetic force beyond that which is necessary to achieve this orientation tends build up lengths of the flakes to excessively roughen the top surface of the layer containing the magnetizable flakes. Modulation of the magnetic force provided by the magnet, as described above using such intervening diffuser block and a plate positioned against the underside of the substrate to be coated, with or without gaps filled with air or non-magnetizable material, is preferred over directly exposing the underside of the substrate to the magnet and making the making the same or greater size than the substrate.

While the coating of fluoropolymer composition containing magnetizable flakes is still liquid, the flakes are mobile, and thus can be oriented by the applied magnetic force to the perpendicular orientation desired. Preferably, the coating is exposed to the magnetic force simultaneously with the step of applying the liquid coating composition to the substrate, which provides the best opportunity for obtaining the perpendicular flake orientation.

The resultant liquid coating, containing the magnetically-induced pattern, is then dried and baked to sinter or otherwise fuse the fluoropolymer to form the release coating, by heating the coating typically to temperatures of 350° C. to 420° C., depending on the fluoropolymer resin used. The flakes in the release coating should be made of material that while magnetizable, are unaffected by such heating. Examples of material from which the flakes can be made include such metals as iron and nickel and alloys containing these metals, with stainless steel being the preferred material. Metals are much more thermally conductive that the polymers in the release coating. For simplicity, the fluoropolymer/flake coating composition is referred to as a release coating both before and after the baking step, when in fact the baking step is necessary before the release (non-stick) characteristic is realized.

The magnetizable flakes include flakes which have a longest dimension which is greater than the thickness of the layer formed from the coating composition which contains the flakes. The layer (coating) thickness will generally be from 5 to 40 micrometers thick. The flake size will then depend on the layer thickness desired. Some of the magnetizable flakes may have a longest dimension which is less than the thickness of the coating, e.g., less than 50 wt. % of the flakes, but this condition may exist because of the flake size distribution in the flakes that are commercially available. The "short" flakes even though perpendicularly oriented in the layer are less efficient in heat transfer because they do not extend through the entire thickness of the layer. Particularly useful are 316L stainless steel flakes having an average longest dimension of from 20 to 60 micrometers, and normally, the flakes will be a mixture of sizes in which a substantial proportion, preferably at least 40 wt %, has a longest dimension of at least 44 micrometers.

Figure 4:
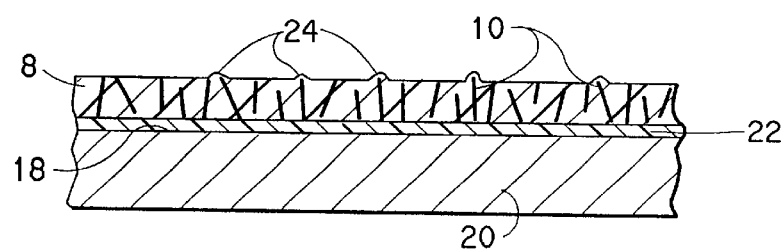
FIG. 4 shows in enlarged side elevation cross section another embodiment of coated substrate of the present invention.

The baking stabilizes (affixes) the magnetically oriented flakes within the release coating on the substrate. As shown in FIG. 2, the substrate can have a roughened surface, such as by grit blasting or chemical etching to create cavities to which the release coating 8 can anchor. Preferably, however, as shown in FIG. 4, the substrate 20, which is a cookware flat bottom as is substrate (flat bottom) 3, has a smooth surface 18, which save the need for the cookware manufacturer to roughen the substrate surface. In this embodiment, the layer containing the flakes is adhered to the substrate 20 via an intervening primer layer 22.

As shown in both FIGS. 2 and 4, some of the perpendicular oriented flakes 10 protrude from the surface of the layer containing the flakes (release coating 8), and the protruding portions of the flakes are enveloped in fluoropolymer composition from which the coating is made to form minute mounds 24. Because of the presence of these mounds, which taper smoothly into the otherwise smooth, flat surface of the layer, the surface of the coating 8 is almost totally fluoropolymer, so as to be able to serve as a release surface. The formation of these mounds 24 is facilitated by the composition of the layer (coating composition) as will be discussed later herein.

Figure 5:
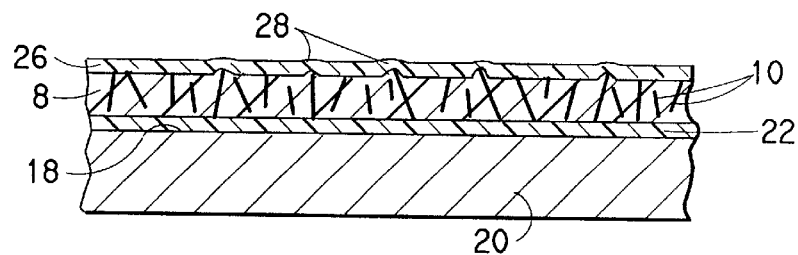
FIG. 5 shows in enlarged side elevation cross section still another embodiment of coated substrate of the present invention.

In the embodiment of FIG. 5, the release coating 8, the same as in FIGS. 2 and 4, is covered by a topcoat 26, which while telegraphing the mounds 24 of coating 8 through to the top surface of the topcoat, smoothes them out even further to form mounds 28, providing an even smoother release surface. The topcoat also adds to the aesthetics of the release surface by improving the gloss.

The layer containing the magnetizable flakes will preferably be 5–30 micrometers thick, more preferably 5–25 micrometers thick (0.2–1 mil). When the release coating is a combination of midcoat (containing the flakes) or undercoat and topcoat, the combined thickness will generally be 5–50 micrometers thick, preferably 5–40 micrometers thick. Preferably, the flake-containing layer will be the thicker layer, constituting 60 to 90% of the total thickness of the layers, and more preferably 70 to 85%, so as to be efficient in transferring heat through the entire thickness of all the layers coated onto the substrate. The magnetizable flakes may have a longest dimension which is greater than the combined thickness of the flake-containing coating and the topcoat, if present. The primer layer, if used will generally have a thickness of 0.5 to 10 micrometers, more often 2.5 to 15 micrometers (0.1–0.6 mils), and the topcoat if used, will generally have a thickness of 2.5 to 10 micrometers. More often in the embodiment shown in FIG. 5, the primer layer will be 6 to 8 micrometers thick, the topcoat, 4 to 6 micrometers thick, and the flake-containing midcoat, 17 to 25 micrometers thick. The layer thicknesses disclosed herein refer to the dry film thickness (DFT).

Fluoropolymers are useful as components in compositions forming the primer layer, the midcoat or underlayer, and the topcoat because of the heat resistance of these resins. Such resins contain at least 35 wt % fluorine. One particularly useful fluoropolymer is polytetrafluoroethylene (PTFE) which provides the highest heat stability among the fluoropolymers. Optionally, the PTFE contains a small amount of comonomer modifier which improves film-forming capability during baking, such as perfluoroolefin, notably hexafluoropropylene (HFP) or perfluoro(alkyl vinyl) ether (PAVE), notably wherein the alkyl group contains 1–5 carbon atoms, with perfluoro(ethyl or propyl vinyl ether) (PEVE and PPVE, respectively) being preferred. The amount of modifier may be insufficient to confer melt-fabricability to the PTFE, generally no more than about 0.5 mole %. The PTFE, can have a single melt viscosity, usually about $1 \times 10^9$ Pa.s, but, if desired, a mixture comprising PTFE's having different melt viscosities can be used to form the fluoropolymer component.

In one aspect of this invention, the fluoropolymer component, is melt fabricable fluoropolymer, either blended with the PTFE, or in place thereof. Examples of such melt-fabricable fluoropolymers include tetrafluoroethylene (TFE) copolymers with one or more of the comonomers as described above for the modified PTFE but having sufficient comonomer content to reduce the melting point significantly below that of PTFE. Commonly available melt-fabricable TFE copolymers include FEP (TFE/HFP copolymer) and PFA (TFE/PAVE copolymer), notably TFE/PPVE copolymer. The molecular weight of the melt-fabricable tetrafluoroethylene copolymers is sufficient to be film-forming and be able to sustain a molded shape so as to have integrity in the primer application. Typically, the melt viscosity of FEP and PFA will be at least about $1 \times 10^2$ Pa.s and may range to about $10–400 \times 10^3$ Pa.s as determined at 372° C. according to ASTM D-1238.

The fluoropolymer component is generally commercially available as a dispersion of the polymer in water, which is the preferred form of the composition for this invention for ease of application and environmental acceptability. By "dispersion" it is meant that the fluoropolymer particles are stably dispersed in an aqueous medium, so that settling of the particles does not occur within the time when the dispersion will be used. The stability of the dispersion can be achieved as the result of the relatively small size of the fluoropolymer particles, typically on the order of 0.2 micrometers, and the use of one or more surfactants in the aqueous dispersion. Such dispersions can be obtained directly by the process known as aqueous dispersion polymerization, optionally followed by concentration and/or further addition of surfactant. Examples of suitable surfactants include at least one of octylphenoxytriethoxyethanol, triethanolamine oleate, among others. As another liquid form of the fluoropolymer/flake composition, it can also be a dispersion in an organic solvent.

The fluoropolymer/flake coating composition used in this invention is generally derived from a dispersion of one or more fluoropolymers to which has optionally been added a dispersion of an acrylic polymer. Suitable midcoat and topcoat are described by U.S. Pat. No. 4,180,609 (Vassiliou); U.S. Pat. No. 4,118,537 (Vary & Vassiliou); U.S. Pat. No. 4,123,401 (Berghmans & Vary); U.S. Pat. No. 4,351,882 (Concannon) hereby incorporated by reference.

Acrylic polymer dispersions are described in U.S. Pat. No. U.S. Pat. No. 4,123,401 (Berghmans and Vary) and U.S. Pat. No. 4,118,537 (Vary and Vasilliou); hereby incorporated by reference. The coating composition typically shows improved coalescence on curing if acrylic polymer has been added to the fluoropolymer/flake composition and to the topcoat composition as well. The acrylic polymer depolymerizes during the baking step, and the depolymerization products vaporize, in the temperature range of about 150° C. below the fusion temperature of the fluoropolymer used to about the fluoropolymer's decomposition temperature, whereby during the baking step, the decomposition products vaporize. The acrylic polymer can be in solution in a solvent compatible with the rest of the system or be present as a stable dispersion of small particles. For desired results, the average particle size is generally below 1 micrometer.

Illustrative of acrylic polymers which can be used as an additive are polymers of one or more monoethylenically unsaturated monomers which also contain one or more monoethylenically unsaturated acid units. Representative of the monomers are alkyl acrylates and methacrylates having 1–8 carbon atoms in the alkyl group, styrene, alpha-methyl styrene and vinyl toluene. Representative of the acid units are acrylic acid, methacrylic acid, fumaric acid, itaconic acid and maleic acid (or anhydride). Mixtures of these polymers can also be used. The acid units of these polymers can optionally be esterified with glycidal esters of 4–14 carbon atoms. Such a polymer is ordinarily present at a concentration of about 2–300% by weight of the fluoropolymer, and preferably about 5–20%. The preferred polymer additive is an acrylic aqueous dispersion of a methylmethacrylate/ ethylacrylate/methacrylic acid 39/57/4 terpolymer.

The compositions forming the primer, intermediate and top coatings used in the present invention may contain one or more pigments, normally in a mill base medium that is either soluble in or miscible with the water of the fluoropolymer aqueous dispersion. In the fluoropolymer/flake coating composition, the magnetizable flakes may be considered to be the pigment. The pigment mill base is normally produced by milling (grinding) pigment in its liquid medium, which deagglomerates the pigment and produces dispersion uniformity. The preferred medium is water which contains an amount of a surfactant sufficient for the mill base to become an aqueous dispersion of the pigment by the milling process. Pigments for use in cookware applications have limitations imposed on their use by the U.S. Food and Drug Administration (FDA) because of food contact. Pigments to be used in this invention must be heat stable and nontoxic. Suitable pigments include at least one member from the group of carbon black, titanium dioxide, iron oxide, and zeolites such as ultramarine blue, cobalt blue, among others.

The compositions forming the topcoat when used in this invention often contain mica particles, and mica particles coated with pigment. Such particles impart scratch resistance to the articles on which they are coated. These particles have an average longest dimension of about 10 to 200 micrometers, preferably 15–50 micrometers, with no more than 50% of the particles of flake having longest dimensions of more than about 500 micrometers. For use in this invention, mica particles coated with pigment having a longest dimension of 1–15 micrometers are preferred. The mica particles coated with pigment preferred for this invention are those described in U.S. Pat. No. 3,087,827 (Klenke and Stratton); U.S. Pat. No. 3,087,828 (Linton); and U.S. Pat. No. 3,087,829 (Linton); hereby incorporated by reference. The micas described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used. The mica or coated mica is ordinarily present in the topcoat at a concentration of about 0.2–20% by dry weight of the composition.

The primer coating when used in this invention is generally derived from an aqueous dispersion of at least one fluoropolymer and a water soluble or water dispersible film-forming polymer binder material. A suitable primer is described by the U.S. Pat. No. 4,087,394 (Concannon); U.S. Pat. No. 5,240,775 (Tannenbaum) and U.S. Pat. No. 5,562, 991 (Tannenbaum); hereby incorporated by reference.

The film-forming polymer binder component that can be used in forming the primer coating is composed of polymer which is thermally stable. This component is well known in primer applications for non-stick finishes, for adhering the fluoropolymer-containing primer layer to substrates and for film-forming within and as part of the primer layer. The binder is generally non-flourine containing and yet adheres to both the fluoropolymer and the substrate. Preferred binders are those that are soluble or solubilized in water or a mixture of water and organic solvent for the binder, which solvent is miscible with water, although solvent-soluble polymer binders can be used in coating compositions in which the liquid vehicle is organic solvent. This solubility aids in the blending of the binder with the fluorocarbon component in the aqueous dispersion form. Polyethersulfone is one example of thermally stable polymer binder, having a glass transition temperature of about 230° C. and a sustained service temperature of about 170° to 190° C. Another example of the binder component is polyamic acid salt which converts to polyamideimide upon baking of the composition to form the primer layer. This binder is preferred because in the fully imidized form obtained by baking the polyamic acid salt, this binder has a continuous service temperature in excess of about 250° C. The polyamic acid salt is generally available as polyamic acid having an inherent viscosity of at about 0.1 as measured as a 0.5 wt % solution in N,N-dimethylacetamide at about 30° C. It is dissolved in a coalescing agent, such as N-methylpyrolidone, and a viscosity-reducing agent, such as furfuryl alcohol and reacted with tertiary amine, preferably triethylamine, to form the salt, which is soluble in water, as described in greater detail in U.S. Pat. No. 4,014,834 (Concannon) and U.S. Pat. No. 4,087,394 (Concannon); the disclosure of both is hereby incorporated by reference. The resultant reaction medium containing the polyamic acid salt can then be blended with the fluoropolymer aqueous dispersion, and because the coalescing agent and viscosity-reducing agent are miscible in water, the blending produces a substantially uniform coating composition. The blending can be achieved by simple mixing of the liquids together without using excess agitation so as to avoid coagulation of the fluoropolymer aqueous dispersion. Typically, the weight ratio of fluoropolymer to polymer binder in the primer compositions will be about 0.5 to 2.5:1. The weight ratios of fluoropolymer to binder disclosed herein are based on the dry weight of these components in the primer layer, which in essence is the same as the relative weight in the primer layer after baking the composition after application as a coating to a substrate. When the primer composition used in the present invention is in the preferred aqueous form, these components will constitute about 5 to 50 wt. % of the total dispersion.

An inorganic filler film hardener component may be present in the primer composition. The film hardener is one or more filler type materials which are inert with respect to the other components of the composition and thermally stable at baking temperatures which fuse the fluoropolymer and binder. Preferably the film hardener is water insoluble so that it is uniformly dispersible but not dissolved in an aqueous dispersion. By filler-type material is meant that the filler is finely divided, generally having a particle size of about 1 to 200 micrometers, usually 2 to 20 micrometers, which is usually obtained by the film hardener component and which imparts durability to the primer layer by resisting penetration of sharp objects that may penetrate the fluoropolymer overcoat.

Examples of the film hardener include one or more metal silicate compounds such as aluminum silicate and metal oxides, such as, titanium dioxide and aluminum oxide. Examples of such film hardeners are described in U.S. Pat. No. 5,562,991 (Tannenbaum) and U.S. Pat. No. 5,250,356 (Batzar); the disclosure of which is hereby incorporated by reference.

The primer composition used in the present invention in aqueous dispersion form may also contain such other additives as adhesion promoters, such as colloidal silica or a phosphate compound, such as a metal phosphate, e.g., Zn, Mn, or Fe phosphate.

The fluoropolymer component, magnetizable flake component, and optional acrylic polymer component which can be used in the coating composition to form the layer containing the flakes have been discussed above, along with the liquid forms the composition may have for application to the substrate. Another important component is the presence of a compatibilizing polymer dissolved in the liquid medium of the composition. As shown in FIG. 3, when the flake 10 is reoriented from the plane of the coating 8' to the more perpendicular orientation, the upright movement of the flake in the coating can cause the formation of minute fissures, such as fissure 30 in the coating 8', to expose this layer, and hereby the entire release coating to premature failure. This results from the fluoropolymer of the coating composition failing to be attracted to the flake 10, so that the flake pulls away from the fluoropolymer in the composition, leaving the fissure 30 in its wake. The presence of the acrylic polymer component does not solve this problem. It has been discovered that the same thermally stable polymer binder that may be used in the primer composition, such as described above, provides the new effect of attracting the fluoropolymer of the composition to move with the movement of the orienting flakes to thereby avoid the formation of fissures in the coating. In effect, the polymer binder is serving as a compatibilizing polymer, with respect to the fluoropolymer component and the magnetizable flakes.

To contrast the role of the polymer binder in the primer layer with the compatibilizing function in the flake-containing layer (composition) of the present invention, when the thermally stable polymer binder is used in the primer layer composition, such polymer binder bonds the primer layer to the substrate and to the fluoropolymer component of the primer composition, which bond is effected by the baking step. In the compatibilizing function of the polymer binder used in the flake-containing composition of the present invention, the attraction of the compatibilizing polymer occurs while the composition applied as a coating on the substrate is still wet, to avoid the formation of fissures prior to the baking step. Examples of the compatibilizing polymer that can be used to form the fluoropolymer/flake compositions of the present invention, include the polyamic acid salts and polyethersulfones described above.

The proportions of fluoropolymer, magnetizable flakes, and compatibilizing polymer can vary, depending on the layer to be formed from the composition. If used as the layer in contact with the substrate, the compatibilizing polymer will also be performing the polymer binder function described above, and so will be a substantial proportion relative the amount of fluoropolymer. If used as the midcoat or the exposed layer of the release coating, e.g. the topcoat, such layers will preferably be substantially fluoropolymer, to provide release character to the coating, and only a small amount of compatilizing polymer will be needed to establish affinity between the flakes and the fluoropolymer in the wet condition, i.e., prior to completion of baking. The proportion of magnetizable flakes will tend to be minimized for ease of handling of the coating composition, and yet provide the heat transfer desired.

Preferred flake-containing compositions include those containing 80 to 95 wt % fluoropolymer, 2 to 10 wt % magnetizable flakes, more preferably 2 to 6 wt %, and 0.2 to 10 wt % of the compatibilizing polymer, more preferably 0.2 to 5 wt % and preferably being the polyamic acid salt, based on the combined weight of these three components. The baked composition, will contain the same proportion of polyamideimide (and fluoropolymer and magnetic flakes) resulting from the heating of the polyamic acid salt in the composition. The fluoropolymer component is preferably a blend of 50 to 95 wt % PTFE and 5 to 50 wt % melt-fabricable tetrafluoroethylene copolymer, such as PTFE/PAVE described above, based on the combined weight of these two fluoropolymers. In the liquid form, the liquid medium will generally constitute 25 to 70 wt % of the combined weight of the liquid medium and the three components described above.

The coatings of the present invention, whether single coating containing the magnetizable flakes, or multiple coatings, such as primer, midcoat (containing the flakes) and topcoat, can be applied to substrates by a variety of techniques and to a variety of substrates. Roller, dip, and spray coating can be utilized. It is only necessary that the coating composition which contains the magnetizable flakes be applied as a liquid composition so that the flakes can be magnetically oriented to extend in the thickness direction. Orientation of the flakes primarily in the coating thickness direction, includes the orientation of some of the flakes at various angles from the perpendicular, in case the application of magnetic force is slightly insufficient. Effective heat transfer may nevertheless result from the resultant baked layer when the long dimension of the flakes nevertheless spans either the entire thickness or almost the entire thickness of the layer, because of the longest dimension of the flakes being longer than the thickness of the layer.

The substrates can be any non-magnetizable material which can withstand the relatively high bake temperatures used to fuse the coatings. Such substrate materials include metals and ceramics, such as aluminum, anodized aluminum, stainless steel, enamel, glass, pyroceram, among others. The substrate can be grit blasted (roughened) or smooth, and cleaned prior to coating. For pyroceram and some glass, improved results are obtained by activation of the substrate surface such as by slight, chemical etch, which is not visible to the naked eye. The substrate can also be chemically treated with an adhesion agent such as the mist coat of polyamic acid salt disclosed in U.S. Pat. No. 5,079, 073 (Tannenbaum); hereby incorporated by reference.

The compositions described above are particularly used to provide an article of cookware, having a cooking surface which comprises a multi-layer, non-stick coating on a substrate which coating minimizes sticking by food residues and which is heat resisting by being stable above about 300° C. The present invention can provide a release-coated substrate having an average surface roughness,(abbreviated Ra), less than 1.5 micrometers, as determined using a Hommel Profilometer, model T-500. Typically, the surface roughness of the exposed surface of the release coating will be at least 0.5 micrometers. This smoothness can be provided by the coating which contains the magnetizable flakes being the release surface on the substrate or by the combination of this coating with a topcoat such as described above. The substrate itself preferably has the same smoothness, preferably less than 1.5 micrometers and more preferably less than 1.25 micrometers. The coated substrate of the present invention may be in the form of numerous articles of cookware such as frying pans, pots, casseroles and the like. Instead if a single circular sidewall such as shown in FIG. 1, the sidewall can be rectangular such as in the case of a griddle.

EXAMPLE

A release coating is formed on the cooking surface of a frying pan made of aluminum using the setup shown in FIG. 1.

Aluminum frying pan 2 has a diameter of 25.4 cm and is typically 1.5–3.2 mm thick, the latter being the thickness of the flat bottom of the pan. The interior surface of the flat bottom is smooth and clean, having a surface smoothness of less than 1.25 micrometers. The frying pan is placed on a steel plate 12 (FIG. 1) which is 0.9 cm thick and 25 cm in diameter in comparison to the 23 cm diameter of the bottom of the frying pan, which is in turn positioned on a diffuser block 11 which is 6.35 cm high and 7.6 cm in diameter, below which is positioned on a pair of stacked permanent rare earth magnet, Neo-37® obtained from Dexter Magnetics, which together produce a magnetic force of 3 tesla (30000 gauss). The stacked magnets are 5.6 cm in diameter and together, 1.5 cm thick.

A primer having the composition of Table 1 is sprayed on the interior of the aluminum frying pan to a dry film thickness (DFT) of 7.5 micrometers. The primer is dried at 66° C. for 5 minutes. A midcoat with magnetizable flakes having the composition of Table 2 is sprayed onto the frying pan to a DFT (dry film thickness) of 18 micrometers as magnetic force is applied from the magnet, through block 11 and plate 12 and through the bottom of the frying pan, causing the flakes in the midcoat overlying the bottom of the pan to orient primarily in the thickness direction of the coating. A topcoat having the composition of Table 3 is sprayed over the midcoat to a DFT of 5 micrometers while the midcoat is still wet. The entire system is baked at 427 to 435° C. for 5 minutes. The resultant release-coated frying pan has a relatively non-reflective bottom interior surface indicating the orientation of the flakes in the thickness direction of the midcoat, while the interior sidewall of the release coating is lighter in color, indicating the flakes in the coating on the sidewall are in the plane of the coating. The surface smoothness of the exposed surface of the release coating has a surface smoothness (roughness), Ra, averaging 1.3 micrometers. Examination of the release coating under 20× magnetification reveals no fissures being present; this includes no fissures being present in the midcoat, which is viewable through the transparent topcoat.

This procedure is repeated except that the magnetic force is applied to only part of the bottom of the frying pan during application of the midcoat. Where the magnetic force is not applied, the baked coating in this coating area has a light-colored appearance in reflected light, resulting from the planar orientation of the flakes in the midcoat. Where the magnetic force is applied, the corresponding area of the baked coating has a dark appearance, because the thickness-direction oriented flakes do not reflect light. When heat from the same cooktop burner is applied to the underside of the frying pan to heat both areas of the release coating, when the light colored area produces an average cooking temperature of 400° F. (204° C.), the dark-colored area where the thickness direction oriented flakes are present produces an average cooking temperature of 440° F. (232° C.). These temperatures are determined by using a surface contact thermocouple, and the temperatures read in each area exhibited some variation, e.g. plus or minus 5° F. (2.8° C.); the temperatures reported, however, are the average temperature readings).

Repetition of the procedure described above, in which the frying pan has a non-reflective bottom, except that the midcoat does not contain any compatibilizing polymer, i.e., no polyamic acid salt, gives a release coating which when examined through the transparent topcoat using a 20× microscope reveals fissures being present in the midcoat.

The "solvent-surfactant blend" (Table 3) added to the blend of acrylic polymer dispersion and fluoropolymer dispersion contains mixed aromatic hydrocarbons, cerium octoate, triethanolamine, oleic acid, Triton® X-100 surfactant; the proportions are the same as for the composition in Table 2. In the midcoat composition, the stainless steel flakes, Cab-O-Sil® fumed silica, ethylene glycol, polyamic acid salt, sulfonate surfactant, Triton® X-100 surfactant, and furfuryl alcohol are milled together for addition to the blend of other components. The acrylic polymer dispersion corresponds to approximately to 39/57/4 (wt. ratio) methyl methacrylate/ethyl acrylate/methacrylic acid. The polymer comprises about 40% of the dispersion, 9% triethanolamine, 8% sodium lauryl sulfate, and the balance to total 100 wt % is water.

TABLE 1

Primer Composition

| Component | Wet Coating Composition (Wt. %) | Solids Content in Finished Article (Wt. %) |
| --- | --- | --- |
| Furfuryl Alcohol | 1.85 | — |
| Polyamic acid salt in N-Methyl Pyrrolidone | 18.3 | 30.39 |
| Deionized Water | 48.8 | — |
| Mica | 0.050 | 0.03 |
| PTFE Dispersion | 8.04 | 27.38 |
| FEP Dispersion | 5.95 | 18.10 |
| Colloidal Silica Dispersion | 3.64 | 6.01 |
| Carbon black dispersion | 8.09 | 13.43 |
| Aluminum silicate dispersion | 5.25 | 4.64 |

TABLE 2

Midcoat Composition

| Component | Wet Coating Composition (Wt. %) | Solids Content in Finished Article (Wt. %) |
| --- | --- | --- |
| PTFE Dispersion | 57.15 | 80.3 |
| PFA Dispersion | 10.34 | 14.7 |
| Deionized Water | 4.96 | — |
| 316L SS Flake* | 1.8 | 4.3 |
| Solvent-Surfactant blend | 10.67 | — |
| Acrylic polymer dispersion | 12.7 | — |
| Polyamic acid salt in N-methyl pyrrolidone | 0.20 | 0.5 |
| Cab-O-Sil ® fumed silica | 0.17 | 0.4 |
| sulfonate surfactant | 0.04 | — |
| Triton ® X-100 surfactant | 0.68 | — |
| ethylene glycol | 0.04 | — |
| furfuryl alcohol | 0.02 | — |
| cerium octoate | 0.60 | — |
| diethyleneglycolmonobutylether | 2.51 | — |
| triethanolamine | 4.75 | — |
| 1,2,4-trimethylebenzene | 1.01 | — |
| cumene | 0.06 | — |
| xylene | 0.06 | — |
| aromatic hydrocarbon | 1.93 | — |

*SS Fine water grade, −325 mesh with a D-50 = 25 micrometers (more than 50% of the particles have a longest dimension of at least 25 micrometers) produced by Novamet Specialty Products of Wyckoff, N.J.
Notes: The polyamic acid salt converts to polyamideimide upon baking. The wet composition contains 36% by weight of water, based on the total wet composition, the water coming primarily from the aqueous dispersion form of the PTFE and PFA.

TABLE 3

Topcoat Composition

| Component | Wet Coating Composition (Wt. %) | Solids Content in Finished Article (Wt. %) |
| --- | --- | --- |
| PTFE Dispersion | 66.95 | 94.55 |
| PFA Dispersion | 3.51 | 4.96 |
| Deionized Water | 3.77 | — |
| Mica (1–15 microns) | 0.21 | 0.49 |
| Solvent-Surfactant Blend | 12.51 | — |
| Acrylic polymer dispersion | 13.04 | — |

What is claimed is:

1. A flat cookware substrate having a baked fluoropolymer release coating thereon, said coating containing magnetizable flakes oriented in the thickness direction of the coating, so as to be free of pattern.

2. The flat substrate of claim 1 wherein said coating includes a layer in which said magnetizable flakes are present, said flakes including flakes having a longest dimension which is greater than the thickness of said layer, said coating having a smooth surface.

3. The substrate of claim 2 wherein said smooth surface is characterized by an average surface roughness of less than 1.5 micrometers.

4. The substrate of claim 1 wherein said substrate has a smooth surface.

5. The substrate of claim 4 wherein said coating is adhered to said substrate though a primer layer on said substrate.

6. The substrate of claim 1 wherein said coating includes a midcoat layer and a topcoat layer, said flakes being supplied to said coating via said midcoat layer.

7. The substrate of claim 6 wherein said midcoat is 5 to 40 micrometers thick and the longest dimension of said flakes is at least 44 micrometers.

8. The substrate of claim 7 wherein said flakes include flakes having a longest dimension of less than 44 micrometers.

9. The substrate of claim 6 wherein said midcoat contains 2–10 wt % of said magnetizable flakes.

10. The substrate of claim 1 being aluminum, glass, ceramic or nonmagnetizable stainless steel.

11. The substrate of claim 1 wherein said coating contains 2–10 wt % of said magnetizable flakes.

* * * * *